(12) United States Patent
Lee et al.

(10) Patent No.: US 6,476,799 B1
(45) Date of Patent: Nov. 5, 2002

(54) METHOD AND APPARATUS FOR THE WIRELESS CAPTURE OF COORDINATE-SHIFT INFORMATION

(75) Inventors: Jeffrey Lee, Panchiao; Po-Hsun Hsien, Kaohsiung; Kenny Chien, Lo Tung, all of (TW)

(73) Assignee: KYE Systems Corp., Taiwan (TW)

( * ) Notice: Subject to any disclaimer, the term of this patent is extended or adjusted under 35 U.S.C. 154(b) by 0 days.

(21) Appl. No.: 09/439,222

(22) Filed: Nov. 12, 1999

(30) Foreign Application Priority Data

Nov. 20, 1998 (TW) ........................................ 87119220 A

(51) Int. Cl.[7] ................................................ G09G 5/00
(52) U.S. Cl. .................. 345/174; 178/18.07; 178/19.03
(58) Field of Search ................................. 345/173–179; 178/18.01, 18.03, 18.07, 18.08, 19.01, 19.03, 19.06, 19.07

(56) References Cited

U.S. PATENT DOCUMENTS

| | | | | |
|---|---|---|---|---|
| 4,514,688 A | * | 4/1985 | Whetstone .................... | 178/18 |
| 5,530,210 A | | 6/1996 | Fukuzaki | |
| 5,644,108 A | | 7/1997 | Katsurahira et al. | |
| 5,670,754 A | * | 9/1997 | Matsushima .................. | 178/18 |
| 6,020,849 A | * | 2/2000 | Fukuzaki ..................... | 345/179 |

* cited by examiner

Primary Examiner—Regina Liang
(74) Attorney, Agent, or Firm—Raymond Sun

(57) ABSTRACT

An apparatus is provided for the wireless capture of coordinate-shift information. The apparatus includes a pulse generator that generates a pulse signal and simultaneously distributes the pulse signal into a first signal along the first path and a second signal along the second path. The apparatus further includes a working area defined by a plurality of crossing X-axis signal lines and Y-axis signal lines, and at least one coil surrounding the working area for generating a magnetic field. The apparatus also includes a scanning circuit coupled to the working area, and a synchronic determination circuit coupled to the pulse generator and the scanning circuit for receiving the first and second signals, and for determining the time delay between the receipt of the first and second signals. The apparatus further includes a signal processing circuit coupled to the scanning circuit and the synchronic determination circuit. The first signal passes through the working area and the scanning circuit to the synchronic determination circuit, and contains coordinate shift information. The position indicator can include a resonance circuit that receives signals from the magnetic field, and then re-transmits resonance signals having different pulse widths to the working area.

18 Claims, 15 Drawing Sheets

METHOD AND APPARATUS FOR THE WIRELESS CAPTURE OF COORDINATE-SHIFT INFORMATION

BACKGROUND OF THE INVENTION

1. Field of the Invention

The present invention relates generally to computer input devices, and in particular, to a method and apparatus for the wireless capture of coordinate-shift information.

2. Background Art

Among computer input devices, mice and/or cursor pens are commonly used together with many computer systems. Conventional mice and cursor pens are generally coupled to the computer system by a cable or other wire for the transfer of information therebetween. However, such cabled or wires connections can be cumbersome in use. As a result, wireless mice and cursor pens were introduced to overcome this problem, and have become very popular in the marketplace.

In general, the conventional wireless mice and cursor pens require the use of a battery set as a power source. However, the sizes of a conventional computer mouse and pen are small, so that the installation of a battery set inside the housing of these devices can be burdensome to the weight, size and use of these devices. In addition, battery-operated wireless mice and cursor pens can provide erroneous signals when the battery becomes weak.

Moreover, conventional wireless mice and cursor pens usually utilize frequency modulation techniques to transmit the resonance signals. However, the use of frequency modulation techniques suffers from certain drawbacks. For example, frequency modulation techniques require circuits that have increased complexity, and often lead to unstable frequency responses and other inaccuracies.

Thus, there remains a need for a wireless input device and system that overcomes the disadvantages set forth above, which avoids the use of a battery set, and which is effective in detecting the coordinate-shift information within a specified working area.

SUMMARY OF THE INVENTION

It is an object of the present invention to provide a method and apparatus for the wireless capture of coordinate-shift information in a manner which can accurately detect the movement or shifting of the input device in a specified working area.

It is another object of the present invention to provide a method and apparatus for the wireless capture of coordinate-shift information in which batteries are not needed to power the input device.

It is yet another object of the present invention to provide a method and apparatus for the wireless capture of coordinate-shift information which provides optimal efficiency in push-button signal processing.

The objects of the present invention can be accomplished by providing a method for the wireless capture of coordinate shift information using movement of a position indicator within a working area. The method includes generating a signal; simultaneously distributing the signal along a first path that includes the working area, and a second path; detecting the times at which the signals from the first and second paths arrive at a common location; and determining the coordinate shift information based on the difference between the arrival times of the signals from the first and second paths.

The present invention can be implemented by an apparatus that includes a pulse generator that generates a pulse signal and simultaneously distributes the pulse signal into a first signal along the first path and a second signal along the second path. The apparatus further includes a working area defined by a plurality of crossing X-axis signal lines and Y-axis signal lines, and at least one coil surrounding the working area for generating a magnetic field. The apparatus also includes a scanning circuit coupled to the working area, and a synchronic determination circuit coupled to the pulse generator and the scanning circuit for receiving the first and second signals, and for determining the time delay between the receipt of the first and second signals. The apparatus further includes a signal processing circuit coupled to the scanning circuit and the synchronic determination circuit. The first signal passes through the working area and the scanning circuit to the synchronic determination circuit, and contains coordinate shift information.

According to one embodiment of the present invention, the position indicator can include a resonance circuit that receives signals from the magnetic field, and then re-transmits resonance signals having different pulse widths to the working area. The position indicator also includes a pulsewidth control circuit coupled to the resonance circuit for changing the width of the resonance signals, and a push-button circuit coupled to the pulsewidth control circuit and the resonance circuit.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known or conventional data processing techniques, hardware devices and circuits are omitted so as to not obscure the description of the present invention with unnecessary detail.

The present invention is directed to a method and system for the wireless capture of coordinate-shift information. A tablet is provided having a working area in which a magnetic field is generated for emitting pulse signals which can be used to power a position indicator. The position indicator (which can be embodied in the form of a wireless mouse, pen, or similar input device) is provided with a pulse-width modulation control circuit and resonance circuit that operate to receive and forward the resonance signals. The position indicator forwards the resonance signals back to the working area, where the tablet synchronically demodulates the resonance signals to determine (1) the movement of the position indicator and (2) whether any switches from the position indicator have been actuated. The method and system of the present invention can be operated in a wireless, battery-free manner, while enjoying simplified circuitry, stable signal transmission and minimum noise interference.

Figure 1:
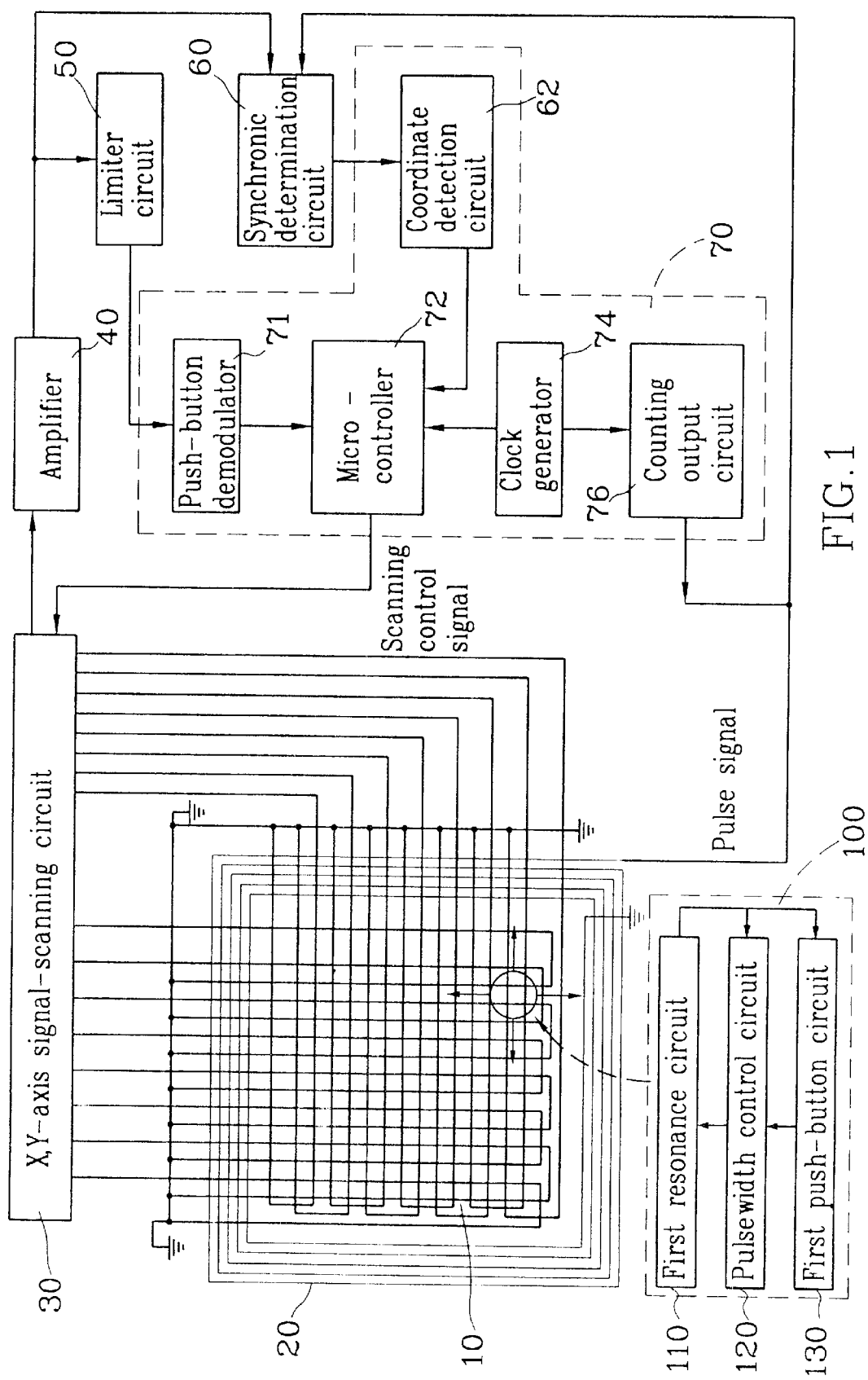
FIG. 1 is a block diagram of a system for the wireless capture of coordinate-shift information according to one embodiment of the present invention.

FIG. 1 is a block diagram of one embodiment of the present invention, where a wireless mouse 100 is used with a device that wirelessly captures coordinate-shift information. This device that wirelessly captures coordinate-shift information can take the form of a tablet (hereinafter referred to as "tablet") that includes a working area 10 that is made up of a plurality of crossing parallel X-axis signal lines and parallel Y-axis signal lines that form a grid with a plurality of points, with each point formed by an intersecting X-axis signal line and Y-axis signal line. Multiple coils 20 are provided to surround the periphery of the working area 10 on the PC board that holds the working area 10, for example. The working area 10 associated with the surrounding coils 20 can be used to form a flat-type tablet. The coils 20 can be used to generate a magnetic field inside the working area 10, with the magnetic field used to supply energy to the wireless mouse 100 (or the wireless cursor pen 200 of FIG. 4 below) that is adapted to be moved inside the working area 10. The grid operates like an "antenna" in that each point is defined by an X-coordinate and a Y-coordinate that can be magnetically coupled by the signal provided from the inductor L1 of the position indicator 100 or 200.

The tablet can also include an XY-axis signal-scanning circuit 30 that provides X-Y coordinate signals in response to the signals received by the X-axis signal lines and the Y-axis signal lines. The scanning circuit's 30 scanning of the X-Y coordinates can be controlled by a signal processing circuit 70. The signal processing circuit 70 can issue a scanning control signal for accurately capturing the motion of the wireless mouse 100 (or the wireless pen 200) in the working area 10.

The output of the scanning circuit 30 can be coupled to an input of an amplifier 40 for amplifying the signals captured by the scanning circuit 30. The output of the amplifier 40 is coupled to an input of a limiter circuit 50 which operates to limit the voltage level of the amplified signals from amplifier 40 just in case the incoming voltage level is too high. The output of the amplifier 40 is also coupled to an input of a synchronic determination circuit 60 which operates to synchronically detect and control the coordinate shift (i.e., for synchronically demodulating the received signals to obtain information regarding the coordinate shift and the push-button status). In addition, the signal processing circuit 70 is coupled to outputs of the limiter circuit 50 and the synchronic determination circuit 60, and operates to generate (1) scanning, control signals for the scanning circuit 30 and (2) basic pulse, signals for the coils 20 (known as the "first path") and pulse signals for the synchronic determination circuit 60 (known as the "second path"). In other words, the signal processing circuit 70 is utilized to control the X-Y axis scanning operation, and to provide pulse signals to the first and second paths for generating the coordinate-shift information detected from the working area 10.

The signal processing circuit 70 can include a push-button demodulator 71 having an input that receives the output of the limiter circuit 50 for receiving the push-button information received from the position indicator 100 or 200. The signal processing circuit 70 can also include a coordinate detection circuit 62 having an input coupled to the output of the synchronic determination circuit 60, and operates to detect the variation of the pulse signals received from the working area 10, and to obtain the coordinate-shift and push-button information using the method described below. The signal processing circuit further includes a micro-controller 72 that has three inputs: a first input coupled to an output of the push-button demodulator 71, a second input coupled to an output of the coordinate detection circuit 62, and a third input coupled to a clock generator 74. The micro-controller 72 controls the scanning operation on the X-Y axis, and determines the coordinate shift of the position indicator 100 or 200 during its motion inside the working area 10. The clock generator 74 can be used to generate a series of fixed-frequency signals, such as a series of 11.0592 MHz signals for usage downstream. The fixed-frequency signals can then be provided to an input of a counting output circuit 76 that counts the number of the clock signals and further generates basic pulse signals that are provided to the coils 20 and the synchronic determination circuit 60 along the first and second paths, respectively. For example, a 345.6 kHz pulse signal can be generated and provided to the coils 20 for forming a magnetic field inside the working area 10. This magnetic field provides substantial energy that can be wirelessly transmitted to the mouse 100 (or the pen 200) that is moving inside the working area 10.

As shown in FIG. 1, for effectively sensing the coordinate-shift signals, the diameter of the wires used to form the X-Y crossing grid of the working area 10 is preferably no smaller than the diameter of the wires used for the coils 20. The wireless mouse 100 operates as the coordinate position indicator, and movement of the mouse 100 within the working area 10 will cause the tablet (i.e., the scanning circuit 30) to sense or scan the coordinate-shift representative of such movement, which will be demodulated by the signal processing circuit 70 to obtain the desired coordinate-shift information useful to the tablet for further use by the user. The energy needed to power any circuit inside the position indicator 100 or 200 is provided by the coils 20 through electro-induction. As a result, the wireless mouse 100 and pen 200 according to the present invention do not need to incorporate a battery source or any other source of energy.

Figure 6:
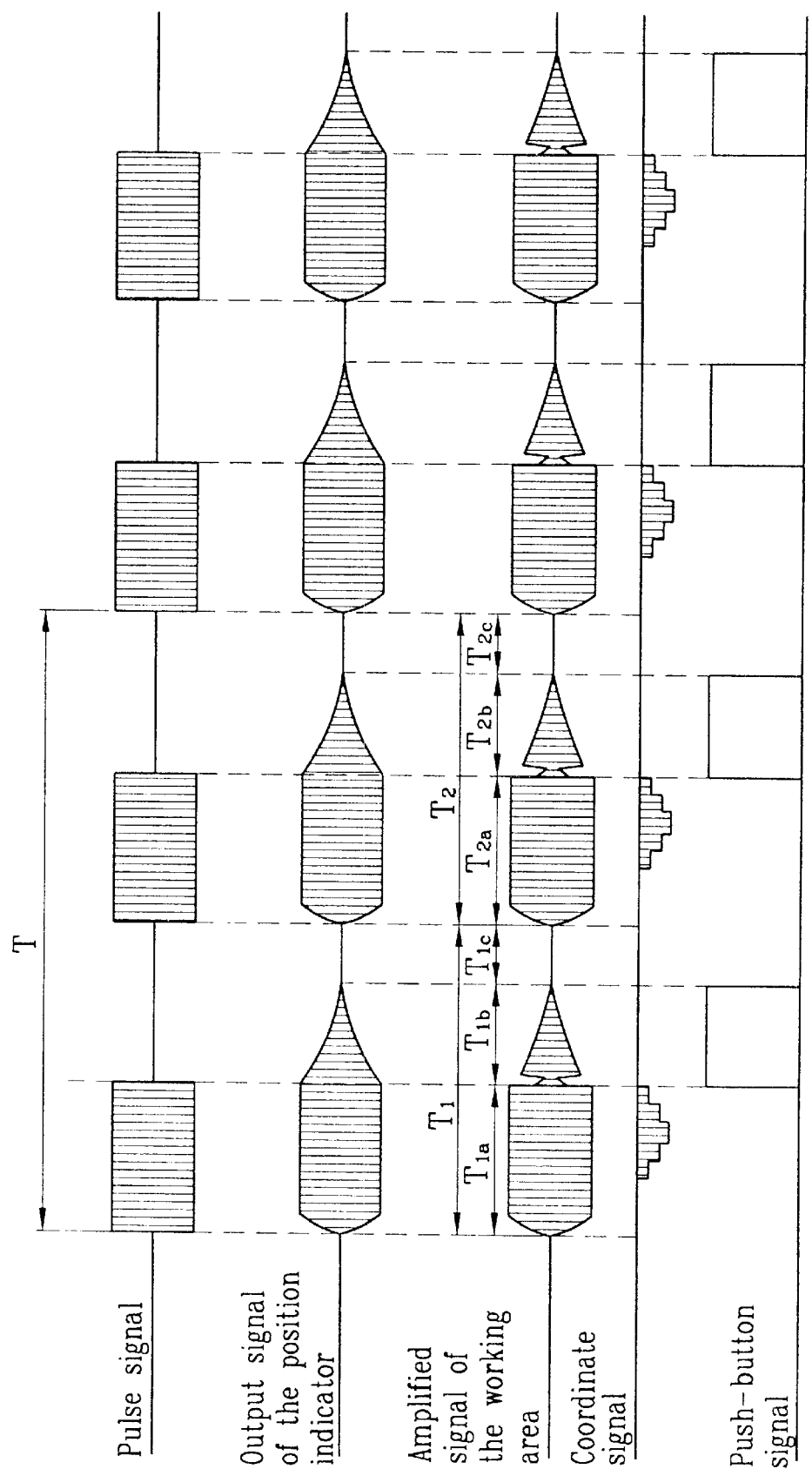
FIG. 6 illustrates schematic wave patterns related to the signals transmitted by the system of FIG. 1.

In addition, contrary to the frequency modulation or amplification modulation used by conventional wireless mice, the position indicator 100 or 200 of the present invention adopts a pulsewidth modulation (PWM) control circuit for transmitting the coordinate-shift signals and for identifying the push-button (i.e., switch) status. PWM is a pulse modulation technique in which the width of a pulse in a pulse train is adjusted in accordance with the input signal. In the present invention, the width of the pulses during the T1$a$, T1$b$, T2$a$ and T2$b$ sub-durations described below in FIG. 6 are varied (i.e., modulated) to provide information regarding the coordinate-shift (during T1$a$ and T2$a$) and the status of the push buttons (during T1$b$ and T2$b$).

The advantages associated with the use of PWM are (1) to reduce possible interference from ambient noise, (2) to have a more stable frequency response, and (3) to have less signal distortion. These are achieved because PWM provides more stable frequencies.

Figure 2:
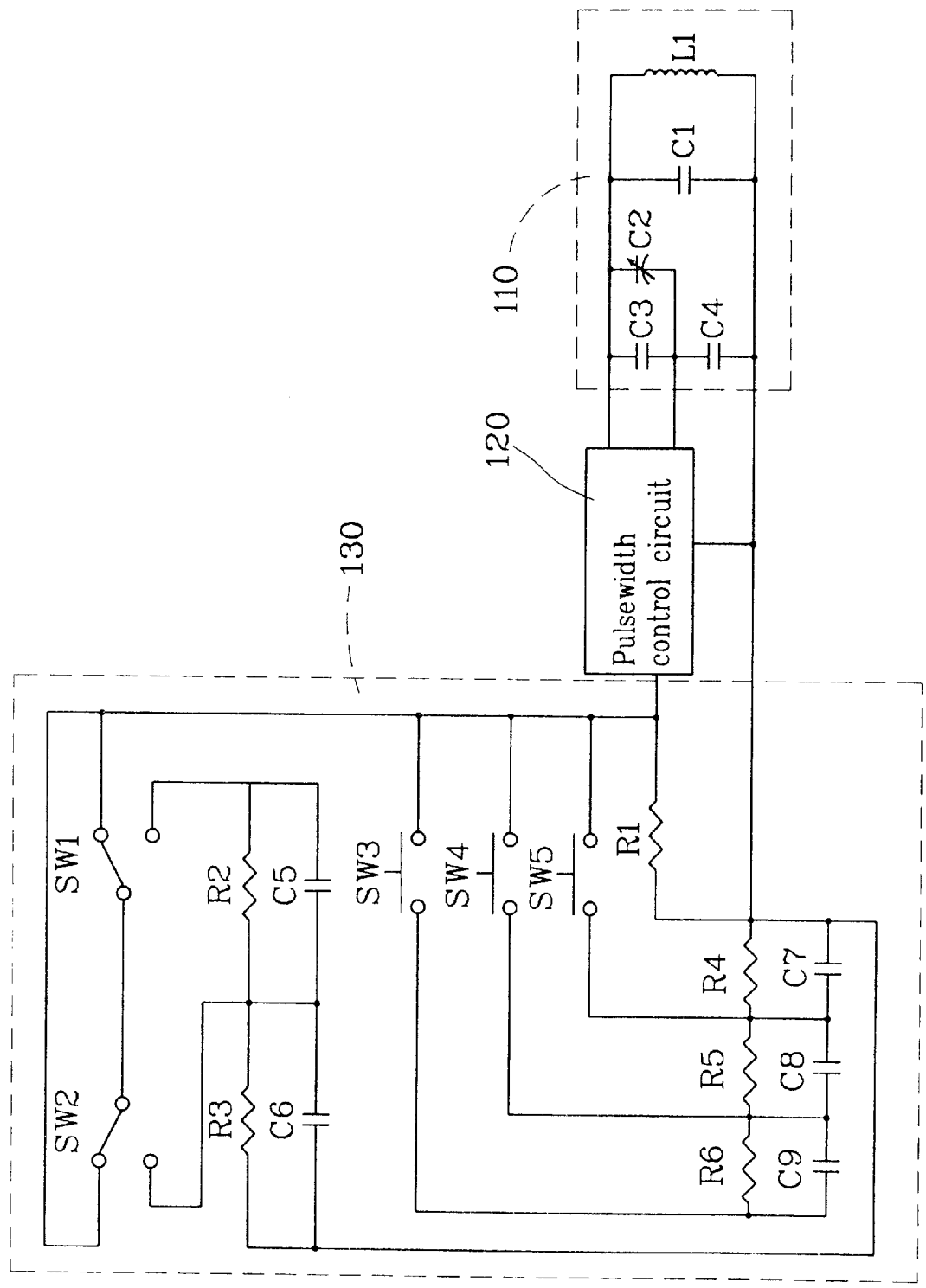
FIG. 2 is a circuit diagram of a computer mouse which can be used as the input device in FIG. 1.

FIG. 2 illustrates the circuitry inside the wireless mouse 100, which has a first resonance circuit 110, a pulsewidth control circuit 120 and a first push-button circuit 130. The pulsewidth control circuit 120 is coupled to the first resonance circuit 110 for altering the width of a resonance signal, and can be a conventional pulse width resonance element or a specific integrated circuit that is available in the marketplace, such as but not limited to a PWM IC, such as the PIC16LC54A sold by Microchip Corp.

The first resonance circuit 110 includes an inductor L1, a variable capacitor C2, and three other capacitors C1, C3 and C4. The inductor L1 can be embodied in the form of copper coils that are coiled around a vertical core provided anywhere inside the housing of the mouse, although it is preferable to position the vertical core at about the center of the housing. The capacitor C1 and the inductor L1 combine to generate resonance signals having different pulse widths.

The first push-button circuit 130 includes a plurality of switches SW1, SW2, SW3, SW4 and SW5, each of which can correspond to a separate push button. Each switch SW1, SW2, SW3, SW4 and SW5 is connected with a respective set of resistors and capacitors (R1+R2+R3, C5+C6), (R1+R3, C6), (R1+R4+R5+R6, C7+C8+C9), (R1+R4+R5, C7+C8), and (R1+R4, C7), respectively. Each set of resistors and capacitors will produce different RC constants that will identify the different switches. In operation, the first resonance circuit 110 operates like a parallel resonance circuit. The inductor L1 and the capacitors C1–C4 in the first resonance circuit 110 exchange energy with each other to resonate a sine waveform Because the first resonance circuit 110 has an equivalent resistance, the amplitude of the sine waveform will be decreased, thereby decreasing the amplitude to produce the push-button signal during sub-duration T1$b$. Therefore, when any of these switches SW1, SW2, SW3, SW4 or SW5 is pressed or closed, the first push-button circuit 130 will generate a series of pulses of different width for the T1$b$ and T2$b$ subdurations that can be used to identify the actuated switch.

An input of the pulsewidth control circuit 120 is coupled to the output of the first push-button circuit 130. The pulsewidth control circuit 120 is also coupled to the first resonance circuit 110 and its variable capacitor C2 for resonating the resonance frequency of the first resonance circuit 110.

The magnetic field from the coils 20 will provide energy which is received by the inductor L1 to power the mouse 100. When the mouse 100 is moved inside the working area 10, the resonance signals generated by the first resonance circuit 110 will effect communication in the working area 10 by inducing signals within the tablet that carry coordinate-shift and push-button information, and will also be resonated by the coils 20 for providing substantial electric induction energy for charging the wireless mouse 100. The coordinate-shift and push-button information from the first resonance circuit 110 will have different pulse widths during the various subdurations described above, which will allow the synchronic determination circuit 60 to identify the coordinate-shift information and the push-button information.

In particular, the inductor L1 will re-transmit a continuous pulse-width resonance signal to the working area 10 when the mouse 100 is present or moving inside the working area 10. This signal will be received by corresponding X,Y locations on the grid that surround the actual location of the mouse 100. The microcontroller 72 can determine the movement of the mouse 100 within the working area 10 by detecting which X,Y locations have received the pulse-width resonance signals from the mouse 100 (via the scanning circuit 30, as described below). The coordinate detection circuit 62 determines the X and Y coordinates of the moving mouse 100 based on the width of the signal within the T1$a$ and T2$a$ subdurations (which signal is indicated to be received at point C in FIG. 3), respectively, and the time of receipt of this signal at point C. The coordinate detection circuit 62 provides the information to the microcontroller 72 in a format (e.g., digital) which can be processed by the microcontroller 72. In addition, the microcontroller 72 can detect the identity of the actuated switch based on the width of the T1$b$ and T2$b$ sub-durations of the signal received at point E in FIG. 3.

Figure 3:
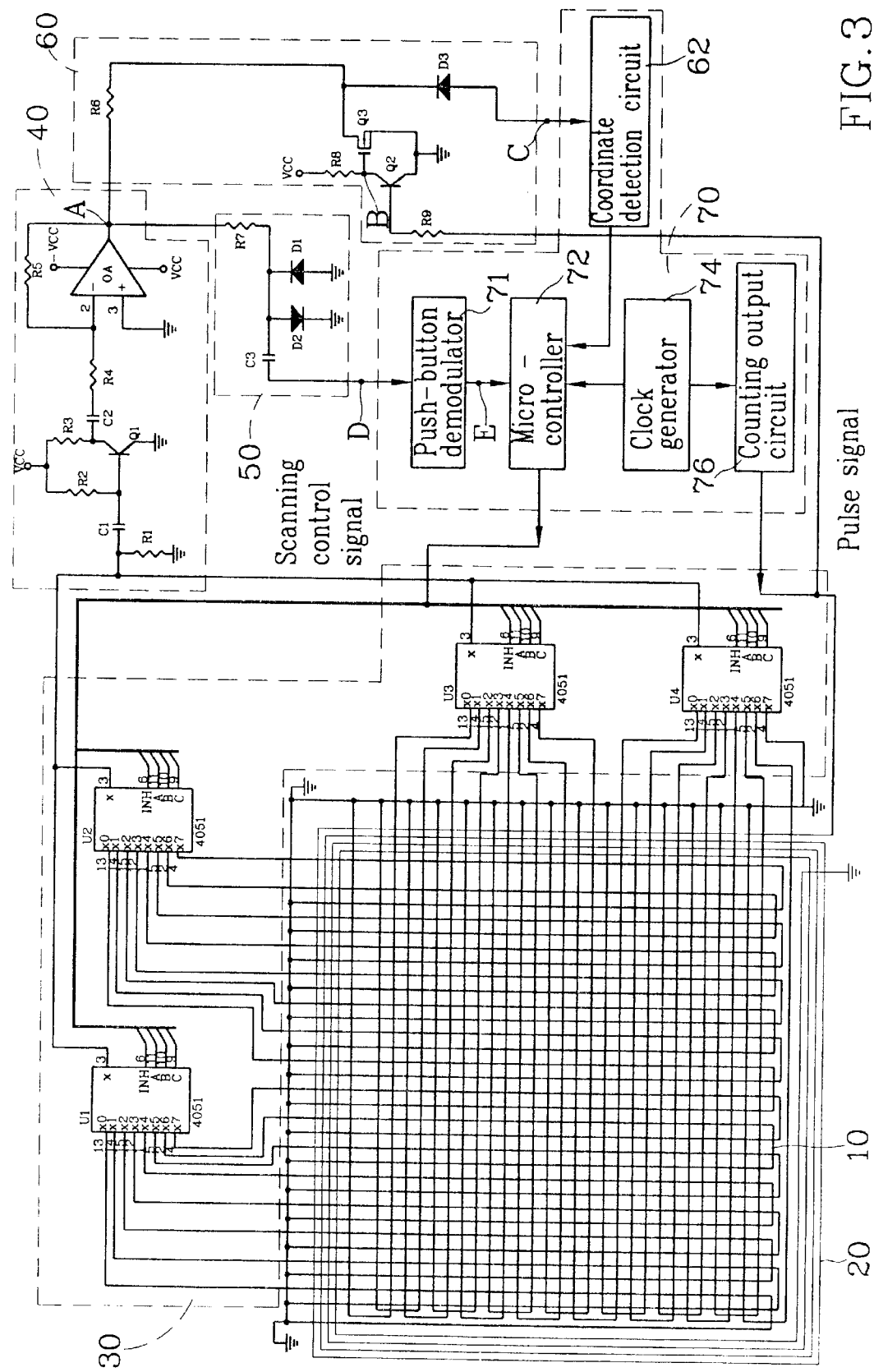
FIG. 3 is a detailed circuit diagram of the system of FIG. 1.

FIG. 3 is a detailed circuit drawing for FIG. 1 illustrating the detailed circuit for the scanning circuit 30, the amplifier 40, the limiter circuit 50 and the synchronic determination circuit 60. The scanning circuit 30 includes a plurality of multiplexers U1, U2, U3 and U4 for scanning the movement of the wireless mouse 100 in the working area 10, and also for locating the mouse 100. The amplifier 40 can include a transistor Q1, connected resistors R1 and R2, and connected capacitors C1 and C2 to form a first-stage reverse-phase amplifier for connecting in series with a first-stage operational amplifier OA connected with resistors R4 and R5. The limiter circuit 50 can include a pair of diodes D1 and D2 that are connected in parallel, and which are further connected in series with a resistor R7 and a capacitor C3. The synchronic determination circuit 60 can be formed by connecting a diode D3 with a bridge transistor which includes a MOS transistor Q3 and a connected bipolar transistor Q2. The synchronic determination circuit 60 further includes two load resistors R6 and R8, and another resistor R9 that operates as a base resistance for the bipolar transistor Q2.

Figure 4:
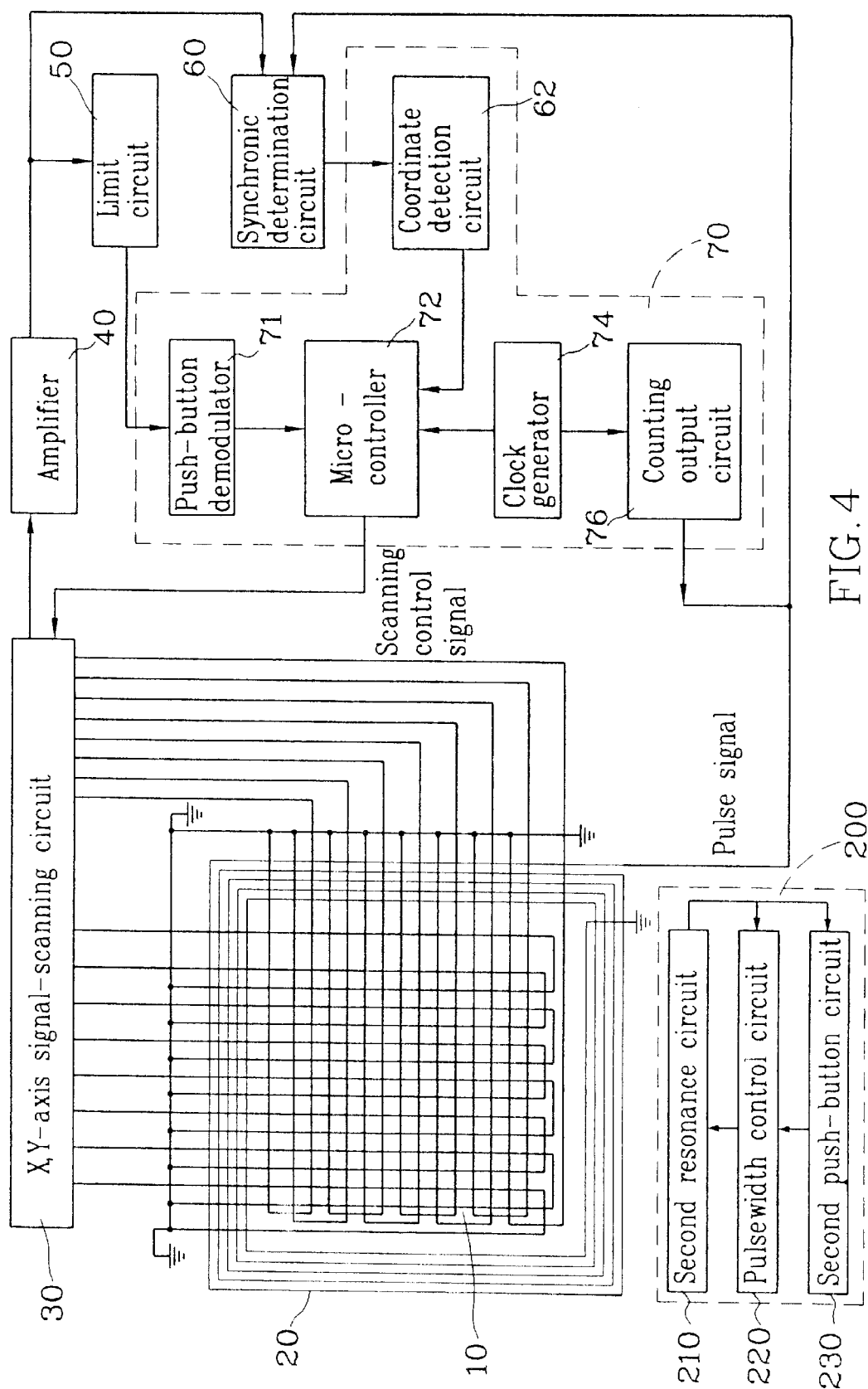
FIG. 4 is a block diagram of a system for the wireless capture of coordinate-shift information according to another embodiment of the present invention.

FIG. 4 illustrates another embodiment of the present invention in which a wireless pen 200 is used as the position indicator instead of a wireless mouse 100. The tablet in FIG. 4 can be the same as the tablet in FIG. 1. As with the wireless mouse 100, the wireless pen 200 does not need to incorporate a battery source or any other source of energy since the pen 200 can receive the energy from the coils 20 by means of pulse width modulation through a second resonance circuit 210. The operation (i.e., communication of signals) of the pen 200 within the working area 10 are the same as that described above and hereinbelow in connection with the mouse 100.

Figure 5:
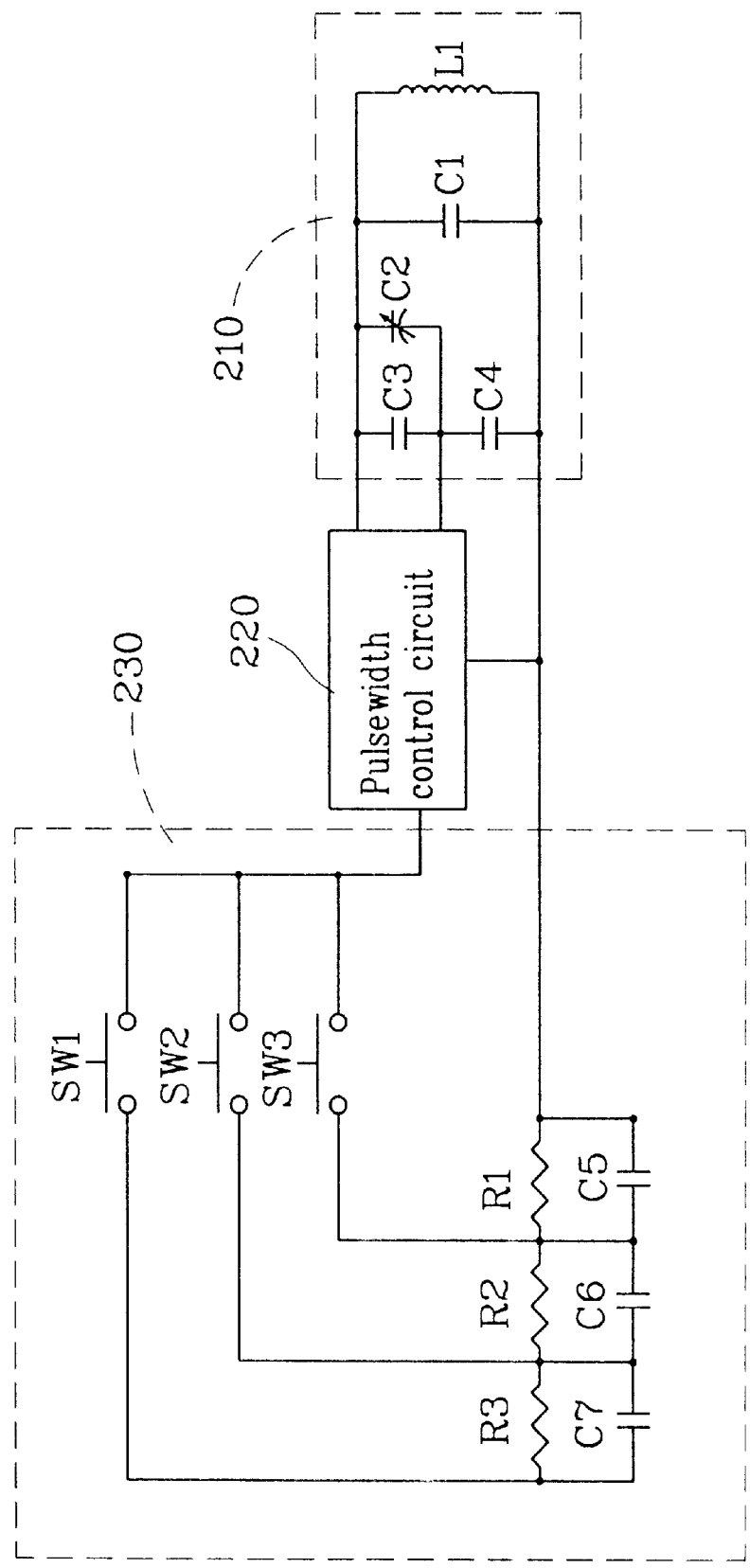
FIG. 5 is a circuit diagram of a cursor pen which can be used as the input device in FIG. 1.

FIG. 5 is a circuit diagram of one possible embodiment for the wireless pen 200. The internal circuit for the pen 200 is similar to that of the wireless mouse 100, and can include a second resonance circuit 210, a pulsewidth control circuit 220, and a second push-button circuit 230. The second resonance circuit 210 and pulsewidth control circuit 220 can be the same as the first resonance circuit 110 and pulse width control circuit 120, and function in a similar manner. The second resonance circuit 210 includes capacitors C1, C2, C3, C4 and an inductor L1. The inductor L1 can be embodied in the form of copper coils wrapped around the tip of the pen 200. The second push-button circuit 230 includes a plurality of switches SW1, SW2 and SW3, each of which can be a push-button. Each switch SW1, SW2 and SW3 is connected with respective sets of resistors and capacitors (R1+R2+R3, C5+C6+C7), (R1+R2, C5+C6), (R1, C5), respectively, for providing different RC constants for each push-button, and operate in a similar manner as the first push-button circuit 130 above.

FIG. 6 illustrates the relationship between the various signal patterns of the system of the present invention, and the signal transmission protocol between the working area 10 and the position indicator (i.e., mouse 100 or pen 200). The pulse signal in FIG. 6 is the signal emitted by the coils 20. The output signal of the position indicator is the output resonance signal from the pulsewidth control circuit 120 or 220. The amplified signal of the working area is the output signal of the amplifier 40 at point A in FIG. 3. The coordinate signal is the output signal of the synchronic determination circuit 60 at point C in FIG. 3. The push-button signal is the push-button signal of the position indicator at point E in FIG. 3.

As shown in FIG. 6, a period T of each pulse signal is divided into a Ti duration and a T2 duration. The Ti duration can be further divided into a T1$a$ subduration, a T1$b$ subduration, and a T1$c$ subduration. During the T1$a$ and T1$b$ subdurations, the X-axis coordinate shift information and the push-button information, respectively, are captured by the scanning circuit 30. Similarly, the T2 duration can also be divided into a T2$a$ subduration, a T2$b$ subduration, and a T2$c$ subduration. During the T2$a$ and T2$b$ subdurations, the Y-axis coordinate shift information and the push-button information, respectively, are captured by the scanning circuit 30. Thus, the use of the T1$b$ and T2$b$ subdurations allows push-button information to be captured. The T1$c$ and T2$c$ sub-durations are blank and are used to determine the length of the T1$b$ and T2$b$ sub-durations.

In FIG. 6, the number of clicks applied on the push button of the position indicator 100 or 200 is counted by pulse-numerating the resonance signal in both the T1$b$ and T1$c$ subdurations. As a result, the push-button status of the wireless mouse 100 and wireless pen 200 can be determined. By providing a full period of the pulse signal, the system and method of the present invention can include both the coordinate shift information and the push-button status.

The method of wirelessly capturing coordinate-shift information according to the present invention will now be described. In the first step, a pulse signal from the counting output circuit 76 is duplicated and provided to two separate paths. In a first path, the pulse signal is provided indirectly to the synchronic determination circuit 60 by detouring through the coils 20. If a position indicator (i.e., mouse 100 or pen 200) is not present in the working area, this pulse signal is provided to the coils 20 and the working area 10, and then are provided to the synchronic determination circuit 60 via the scanning circuit 30, the amplifier 40, and the limiter circuit 50. At this time, the pulse signal will continue to be emitted from the coils 20.

On the other hand, if a position indicator is now present in the working area, this pulse signal is provided to the coils 20 and is received by the inductor L1 of the position indicator to power the position indicator, which in turn re-transmits resonance signals from the inductor L1 to the working area 10. From the working area 10, the resonance signals are provided to the synchronic determination circuit 60 via the scanning circuit 30, the amplifier 40, and the limiter circuit 50. At this time, the microcontroller 72 will recognize the receipt of coordinate shift information, and will cause the counting output circuit 76 to temporarily stop generating pulse signals so that no further pulse signals will be generated. During this time, the position indicator will transmit the resonance signals to the working area 10 to indicate the changing coordinates of the moving position indicator, with the subduration T1$a$ containing x-axis information and the subduration T1$b$ containing y-axis information. As a result, all the x-axis and y-axis information can be transmitted in one period T. The resonance signals from the position indicator will continue to be transmitted to the working area 10 until the position indicator is removed from the working area 10, at which time the microcontroller 72 will cause the counting output circuit 76 to resume generating pulse signals. The transmission time (i.e., total time from transmission of the pulse signal to the time the resonance signal is received by the synchronic determination circuit 60) for this first path will be referred to as the "first elapsed time".

In the second path, the pulse signal is provided directly from the counting output circuit 76 via resistor R9 to the synchronic determination circuit 60. The transmission time for this second path will be referred to as the "second elapsed time".

In the second step, the current coordinate position (also referred to herein as coordinate-shift information) of the position indicator and the push-button status of the position indicator can be determined by comparing the return pulse signal via the first path with the pulse signal via the second path. In other words, the current coordinate position and the push-button status can both be determined by judging the time delay between the first and second elapsed times. As the position indicator moves in the working area 10 and interacts with the pulse signal from the coils 20, a resonance signal is induced from the position indicator to delay or extend the transmission time for the first elapsed time. The push-button status can be determined from the subdurations T1$b$ and T2$b$ of the coordinate signal, as explained above in connection with FIG. 6 and below in connection with FIGS. 11–15. As a result, a time difference between the first and second elapsed times will exist only if the position indicator has been moved inside the working area 10.

Figure 7:
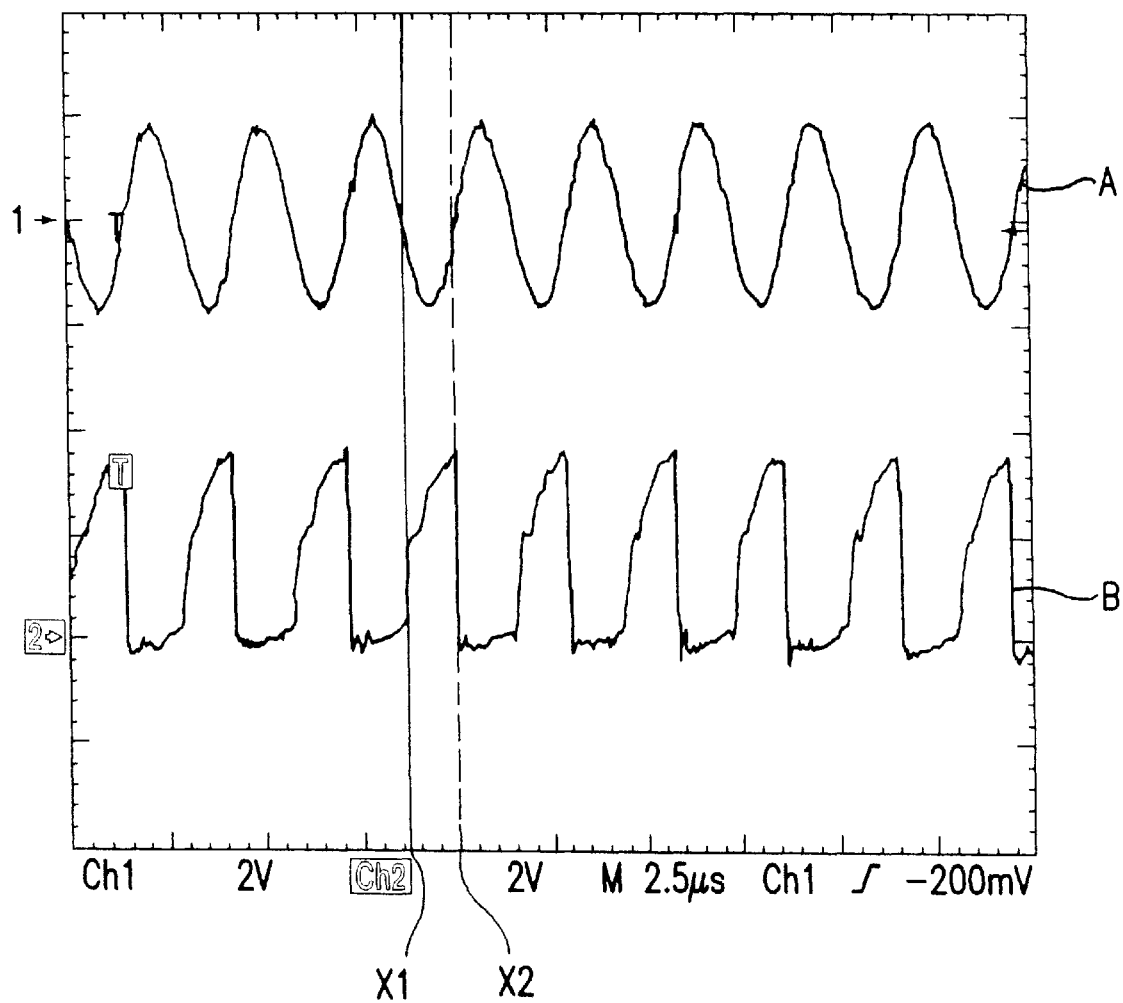
FIG. 7 illustrates the signals detected in FIG. 3 at the output of the amplifier and at the collector electrode of transistor Q2 of the synchronic determination circuit, while the position indicator is motionless in the working area.

FIGS. 7–10 illustrate the comparisons between certain wave patterns for the tablet of FIGS. 1 and 4. FIG. 7 provides a comparison between the output signal A of the amplifier 40 and the signal B at the collector terminal of the transistor Q2 in the synchronic determination circuit 60 in FIG. 3, at the time instant when the position indicator is motionless in or absent from the working area 10. Point A represents the pulse or resonance signal from the first path, and point B represents the pulse signal from the second path. As shown in FIG. 7 through the help of the lines X1 and X2 that segregate a portion of the signals, the signals A and B are in the same phase (i.e., there is no time delay between the first and second paths) when the position indicator 100 or 200 is motionless in or absent from the working area 10.

In particular, in FIG. 7, when point B is at high voltage (as shown in the portion segregated by X1 and X2), transistor Q3 will turn on, which will cause the N electrode of the diode D3 to approach zero, so that the voltage at point C will also approach zero (because diode D3 will only allow negative voltages pass therethrough). This can be seen in FIG. 8 explained below. When the voltage at point B is zero, any negative voltage signal from point A will pass through diode D3 to point C. This signal from point A to point C represents the signal in sub-duration T1a/T2a of FIG. 6.

Figure 8:
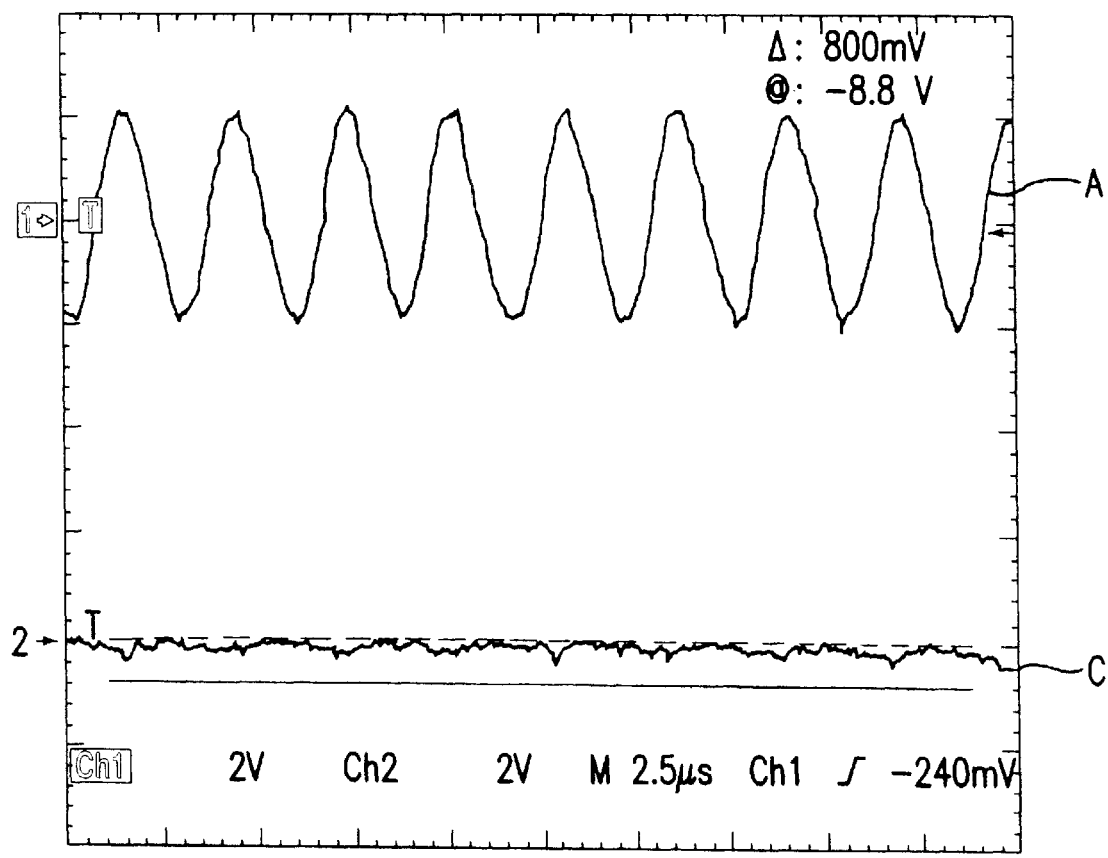
FIG. 8 illustrates the signals detected in FIG. 3 at the output of the amplifier and at the output of the diode D3 of the synchronic determination circuit, while the position indicator is motionless in the working area.

FIG. 8 provides a comparison between the output signal A of the amplifier 40 and the output signal C of the diode D3 in the synchronic determination circuit 60 in FIG. 3, at the time instant when the position indicator is motionless in or absent from the working area 10. As shown in FIG. 8, there is no phase difference between the signals A and C when the position indicator 100 or 200 is motionless in or absent from the working area 10. In other words, there is no delay between the first and second elapsed times.

Figure 9:
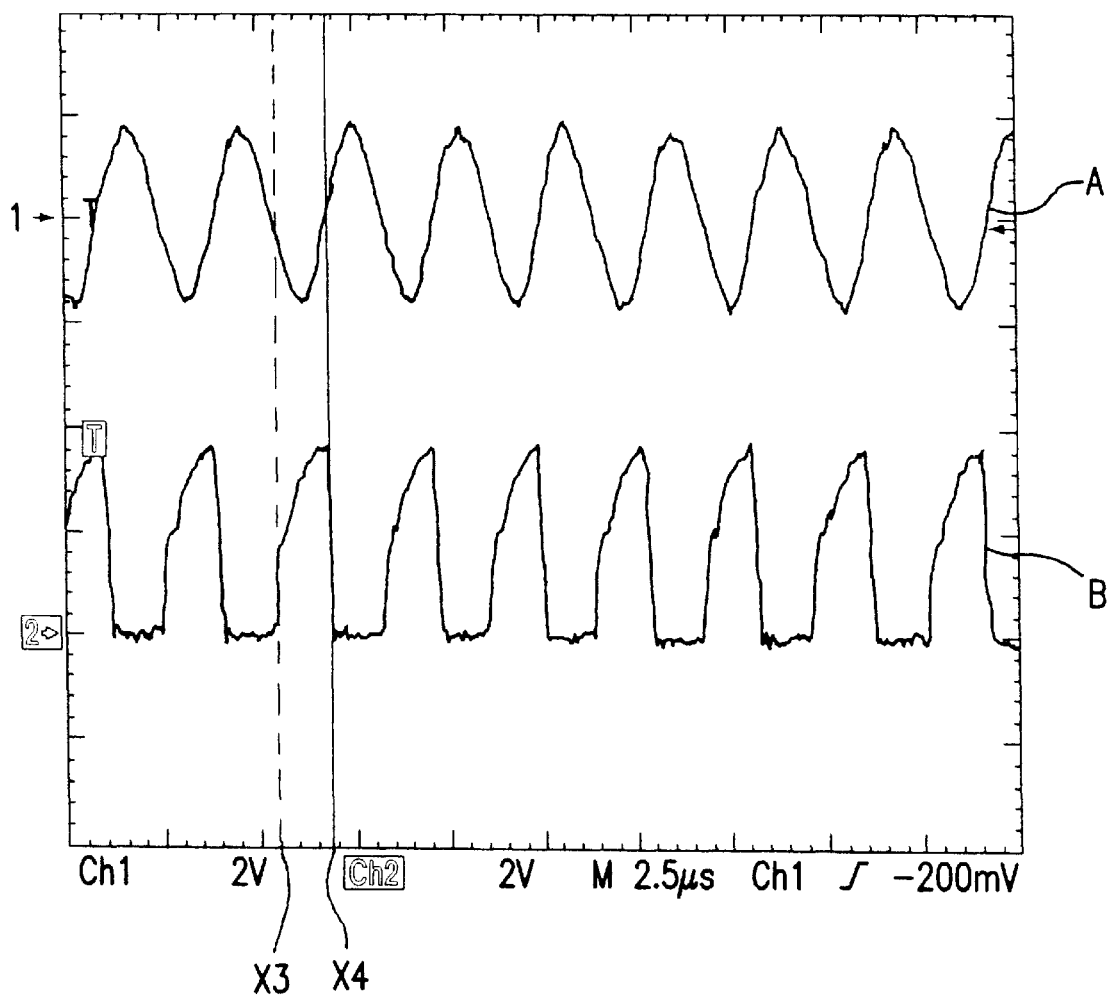
FIG. 9 illustrates the signals detected in FIG. 3 at the output of the amplifier and at the collector electrode of transistor Q2 of the synchronic determination circuit, while the position indicator is moving in the working area.

FIG. 9 provides a comparison between the output signal A of the amplifier 40 and the signal B at the collector terminal of the transistor Q2 in the synchronic determination circuit 60 in FIG. 3, when the position indicator is moving in the working area 10. As shown in FIG. 9 through the help of the lines X3 and X4 that segregate a portion of the signals, a substantial phase difference exists between the signals A and B when the position indicator 100 or 200 is moving in the working area 10. This phase difference reflects the time delay between the first and second paths caused by the additional time needed for the interaction between the moving position indicator and the working area 10. In particular, there is a small duration of waveform (i.e., signal) to the left of X3 of the output signal A that represents a negative voltage signal that will be passed through the diode D3 to point C.

Figure 10:
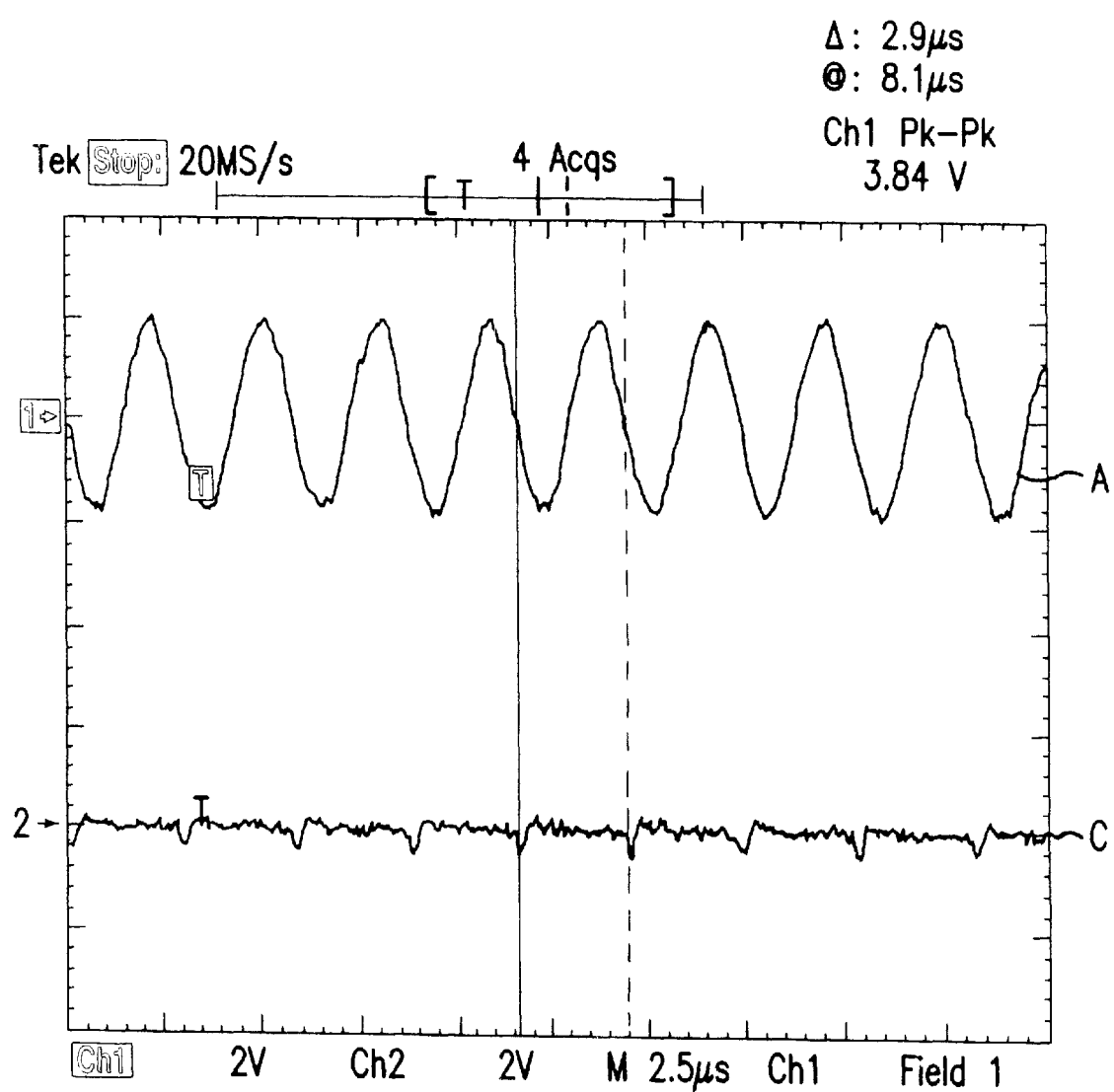
FIG. 10 illustrates the signals detected in FIG. 3 at the output of the amplifier and at the output of the diode D3 of the synchronic determination circuit, while the position indicator is moving in the working area.

FIG. 10 provides a comparison between the output signal A of the amplifier 40 and the output signal C of the diode D3 in the synchronic determination circuit 60 in FIG. 3, at the time when the position indicator is moving in the working area 10. Comparing FIG. 10 with FIG. 8, it can be seen that the signal C from the diode D3 has a negative voltage. The signal C can also be described as the coordinate signal shown in FIG. 6.

Figure 11:
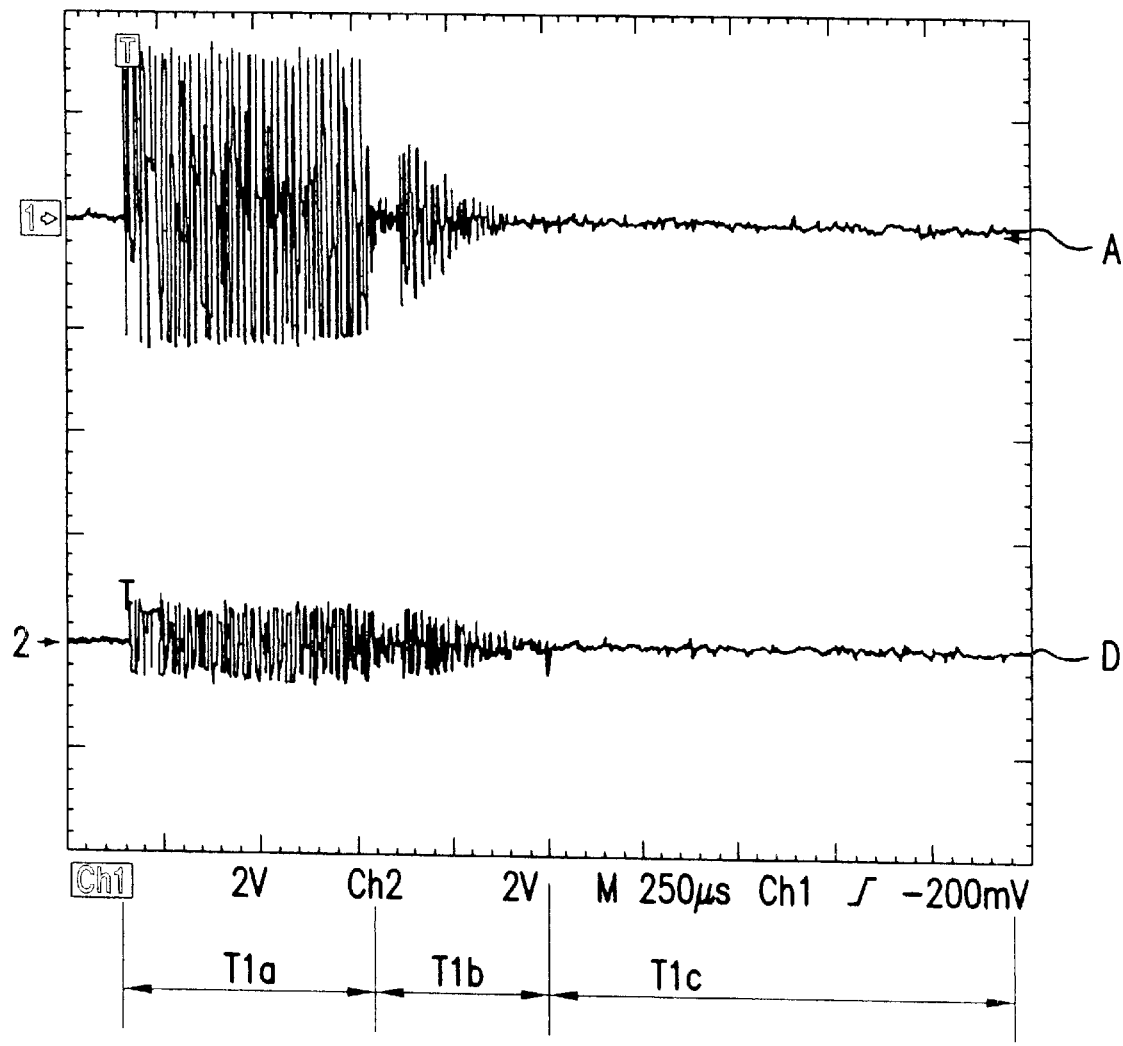
FIG. 11 illustrates the signals detected in FIG. 3 at the output of the amplifier and at the output of the limiter circuit, when no click operation is applied to the push buttons of the position indicator.

FIGS. 11–15 illustrate the comparisons between certain wave patterns for the push button operation of the position indicator 100 or 200. FIG. 11 provides a comparison between the output signal A of the amplifier 40 and the output signal D of the limiter circuit 50 in FIG. 3, at the time instant when the push buttons on the position indicator have not been pressed or actuated. Point D represents the conjunction between the limiter circuit 50 and the push-button demodulator 71. The difference in profile of the signal A between FIGS. 11, 7 and 8 is a result of selecting different scale options. In addition, by comparing the T1a and T1b subdurations in both FIGS. 6 and 11, it can be seen that the T1b duration is shorter when no push button is actuated.

Figure 12:
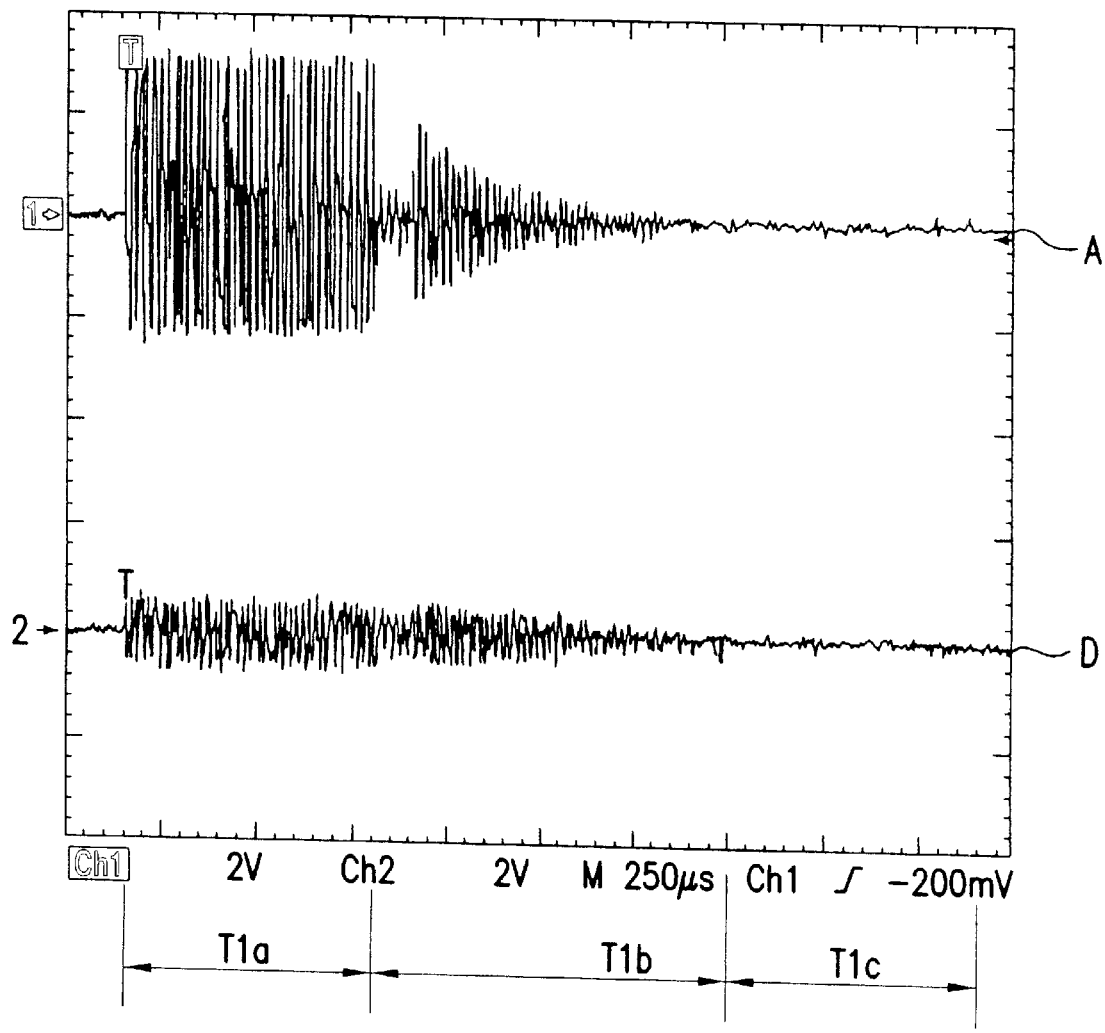
FIG. 12 illustrates the signals detected in FIG. 3 at the output of the amplifier and at the output of the limiter circuit, when click operation is applied to the push button SW1 of the position indicator.

FIG. 12 provides a comparison between the output signal A of the amplifier 40 and the output signal D of the limiter circuit 50, when the push buttons on the position indicator have been actuated. When the T1b subdurations for the signal at point D in FIGS. 11 and 12 are compared, it is noted that the subduration T1b in FIG. 12 is longer than the subduration T1b in FIG. 11 when the push button SW1 of the position indicator is actuated. As illustrated in greater detail below, by analyzing the time of the resonance signal in the subduration T1b, the actuated push button can be determined.

Figure 13:
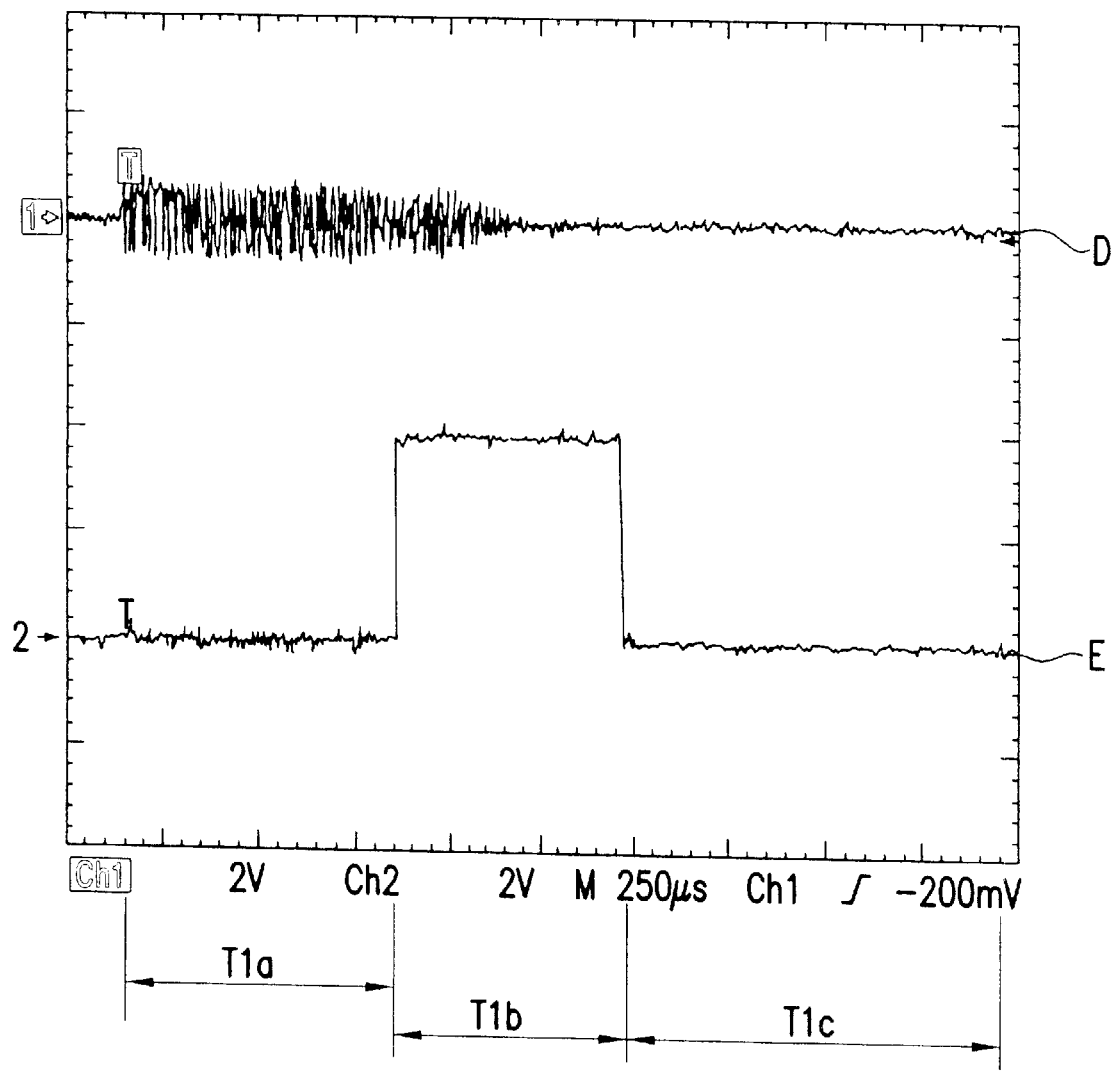
FIG. 13 illustrates the signals detected in FIG. 3 at the output of the limiter circuit and at the output of the push-button demodulator, when no click operation is applied to the push buttons of the position indicator.

FIG. 13 provides a comparison between the output signal D of the limiter circuit 50 and the output signal E of the push-button demodulator 71 (i.e., the push-button signal) in FIG. 3 when the push buttons on the position indicator have not been pressed or actuated. It is noted that the subduration T1b for the signal at point D in FIG. 13 is shorter than the subduration T1b for the push-button signal at point E when none of the push buttons on the position indicator have been pressed or actuated.

Figure 14:
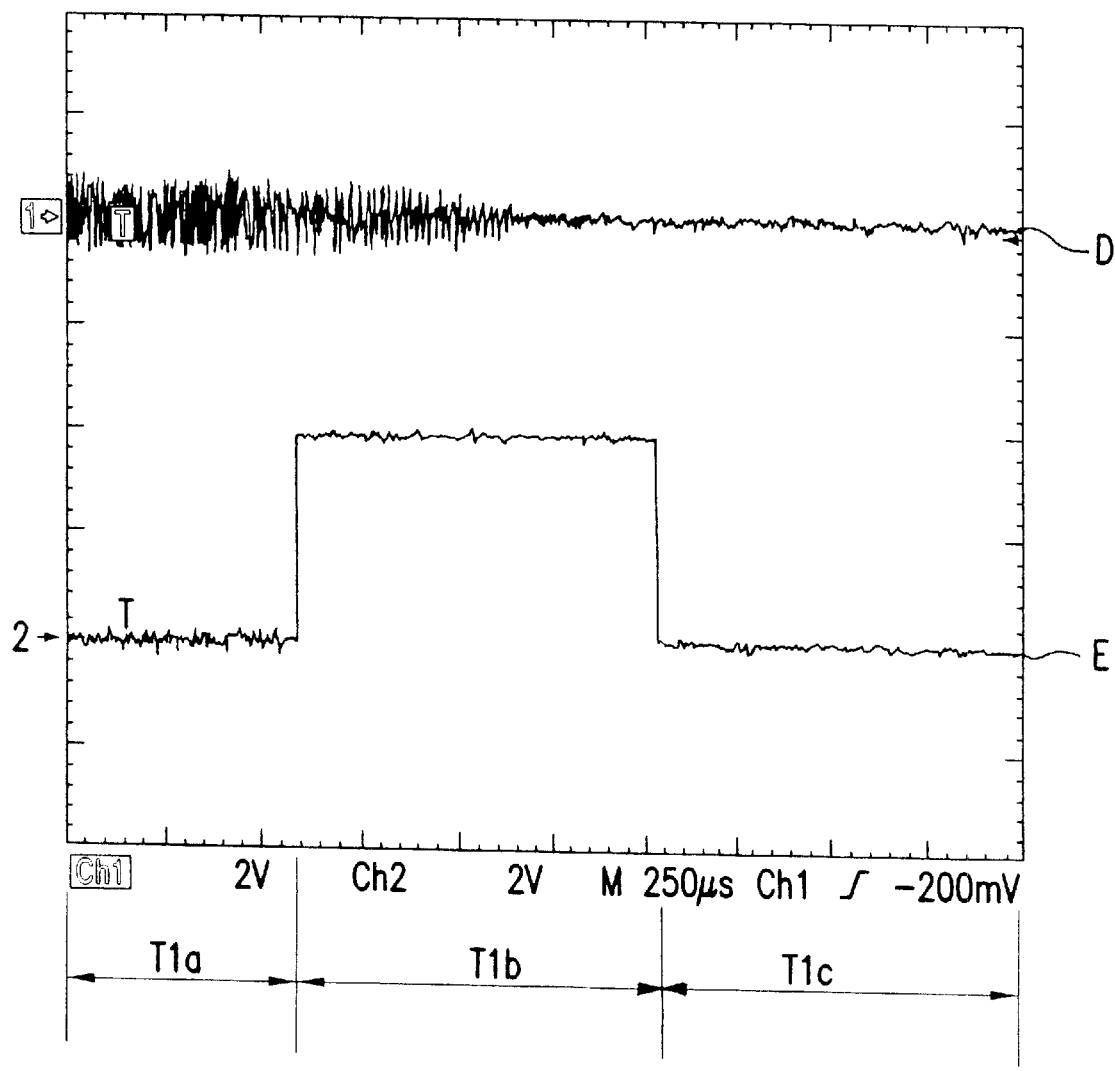
FIG. 14 illustrates the signals detected in FIG. 3 at the output of the limiter circuit and at the output of the push-button demodulator, when a single click operation is applied to the push button SW1 of the position indicator.

FIG. 14 provides a comparison between the output signal D of the limiter circuit 50 and the output signal E of the push-button demodulator 71 in FIG. 3 when the push button SW1 on the position indicator has been actuated. It is noted that the resonance duration for the signal at point D during subduration T1b in FIG. 14 is longer than in FIG. 13, and the width of the square wave for the push-button signal at point E is also longer than in FIG. 13, when the push button SW1 is actuated.

Figure 15:
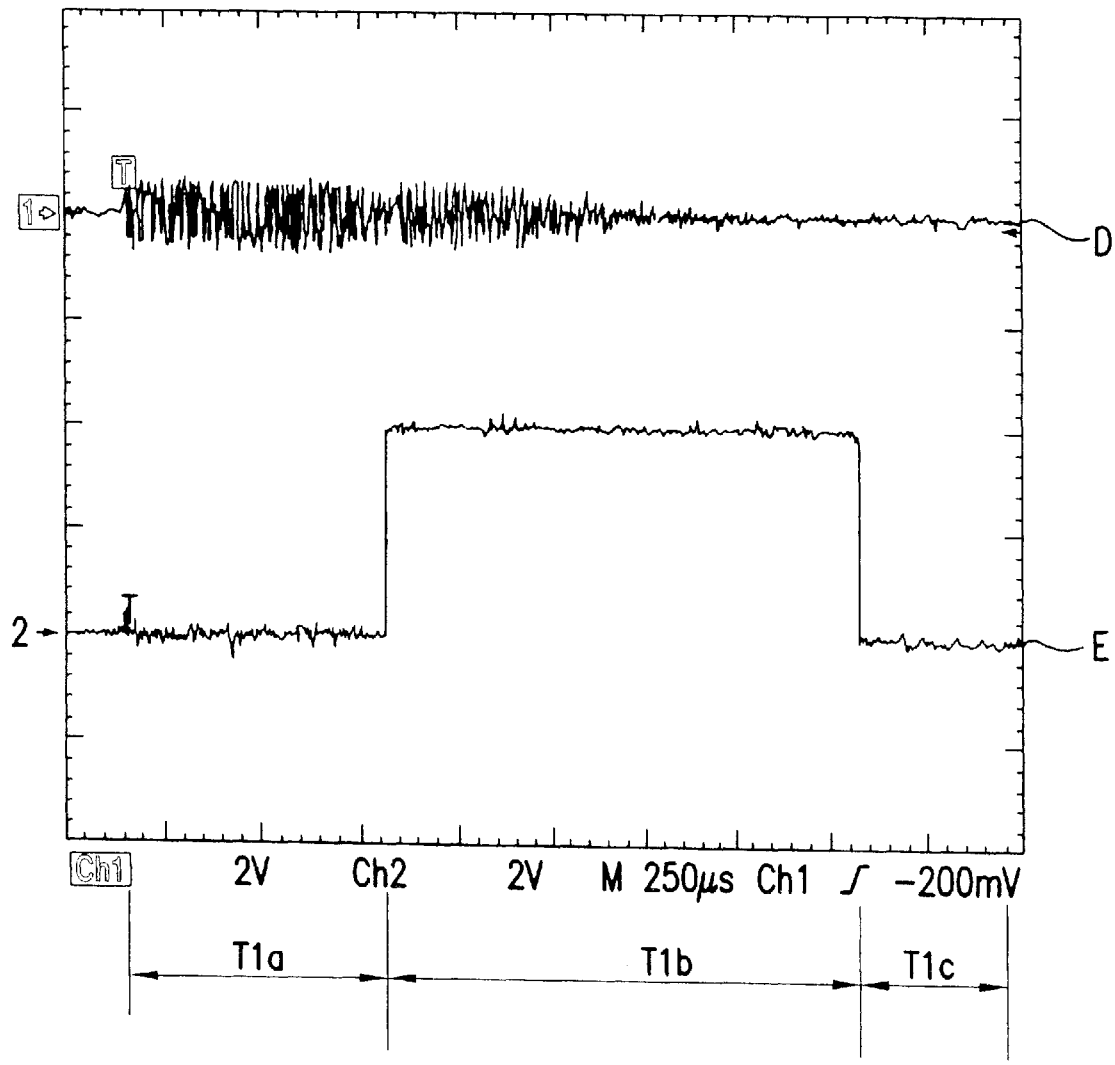
FIG. 15 illustrates the signals detected in FIG. 3 at the output of the limiter circuit and at the output of the push-button demodulator, when a click operation is applied to the push button SW2 of the position indicator.

FIG. 15 provides a comparison between the output signal D of the limiter circuit 50 and the output signal E of the push-button demodulator 71 in FIG. 3 when the push button SW2 on the position indicator has been actuated. It is noted that the resonance duration for the signal at point D during subduration T1b in FIG. 15 is even longer than in FIG. 14, and the width of the square wave for the push-button signal at point E is also longer than in FIG. 14, when the push button SW2 is actuated. Thus, the identity of the actuated push-button (i.e., either SW1 or SW2) can be determined based on the duration of the T1b subdurations for the signals at points D and E.

As a result, in the present invention, the motion (i.e., coordinate shift information) of the position indicator 100 or 200 can be determined by determining the delay between the receipt of two pulse signals traveling along two separate paths. In addition, the subdurations T1b and T2b within a period of a resonance signal can help determine the push-button status (i.e., are any switches SW actuated) and the identity of the actuated push-button.

In addition, when compared to conventional tablets, the present invention provides a tablet that is simpler in construction based on two reasons or features. First, the present invention uses the coils 20 to transmit signals to a position indicator, and uses the grid in the working area 10 to receive resonance signals from the position indicator. While conventional tablets position the coils 20 inside the grid, the present invention positions the coils around the grid, thereby reducing the number of X and Y lines that are needed. Second, conventional wireless tablets usually use two sets of four multiplexers, with one set for controlling the transmission of the pulse signals to the position indicator, and the other set for receiving the signals from the position indicator. In contrast, the present invention only requires the use of one set of four multiplexers U1–U4 since the coils 20 can transmit pulse signals to the position indicator without the aid of multiplexers.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A method for the wireless capture of coordinate shift information using movement of a position indicator within a working area, comprising:

generating a signal;

simultaneously distributing the signal along a first path that includes the working area, and a second path;

detecting the times at which the signals from the first and second paths arrive at a common location; and determining the coordinate shift information based on the difference between the arrival times of the signals from the first and second paths;

wherein each generated signal has a period with a first sub-duration that contains the coordinate shift information, and a second sub-duration that contains information regarding whether a push button on the position indicator has been actuated.

2. The method of claim 1, further including:

utilizing the signal from the first path to power the position indicator.

3. The method of claim 2, further including:

the position indicator modulating the signal received from the first path, and providing a resonance signal back to the working area from which the resonance signal is provided to the common location.

4. The method of claim 3, wherein the resonance signal includes coordinate shift information and information regarding whether a push button has been actuated.

5. The method of claim 4, wherein the information regarding whether a push button has been actuated includes the identity of an actuated push button.

6. The method of claim 1, wherein the presence of the position indicator in the working area delays the transmission of the signal in the first path to the common location.

7. The method of claim 1, further including:

surrounding the working area with at least one coil that receives the pulse signal from the first path and thereupon generates a magnetic field.

8. Apparatus for the wireless capture of coordinate shift information, comprising:

a pulse generator that generates a pulse signal and simultaneously distributes the pulse signal into a first signal along a first path and a second signal along a second path;

a working area defined by a plurality of crossing X-axis signal lines and Y-axis signal lines;

at least one coil surrounding the working area for generating a magnetic field;

a scanning circuit coupled to the working area;

a synchronic determination circuit coupled to the pulse generator and the scanning circuit for receiving the first and second signals, and for determining the time delay between the receipt of the first and second signals; and a signal processing circuit coupled to the scanning circuit and the synchronic determination circuit;

wherein the first signal passes through the working area and the scanning circuit to the synchronic determination circuit, and contains coordinate shift information.

9. The apparatus of claim 8, further including:

an amplifier coupled to the scanning circuit for amplifying the first signal received from the working area; and a limiter coupled to the amplifier for stabilizing and limiting the amplified first signal.

10. The apparatus of claim 8, wherein the first signal also contains push button status information.

11. The apparatus of claim 10, wherein the signal processing circuit includes:

a controller coupled to the scanning circuit for controlling the scanning of the working area;

a coordinate detection circuit coupled to the synchronic determination circuit and the controller;

a push button demodulator coupled to the scanning circuit and the controller for demodulating the push button status information; and wherein the controller determines the coordinate shift information received from the coordinate detection circuit.

12. The apparatus of claim 8, wherein the second signal is directly transmitted to the synchronic determination circuit.

13. A system, comprising:

(a) an apparatus for the wireless capture of coordinate shift information, including:

a pulse generator that generates a pulse signal and simultaneously distributes the pulse signal into a first signal along a first path and a second signal along a second path;

a working area defined by a plurality of crossing X-axis signal lines and Y-axis signal lines;

at least one coil surrounding the working area for generating a magnetic field;

a scanning circuit coupled to the working area;

a synchronic determination circuit coupled to the pulse generator and the scanning circuit for receiving the first and second signals, and for determining the time delay between the receipt of the first and second signals; and a signal processing circuit coupled to the scanning circuit and the synchronic determination circuit;

wherein the first signal passes through the working area and the scanning circuit to the synchronic determination circuit, and contains coordinate shift information; and (b) a position indicator positioned in the working area, including:

a resonance circuit having means for receiving signals from the magnetic field, and for re-transmitting resonance signals having different pulse widths to the working area;

a pulsewidth control circuit coupled to the resonance circuit for changing the width of the resonance signals; and a push-button circuit coupled to the pulsewidth control circuit and the resonance circuit.

14. The system of claim 13, wherein the resonance signals contain coordinate shift information.

15. The system of claim 14, wherein the resonance signals further contains push button status information.

16. The system of claim 13, wherein the second signal is directly transmitted to the synchronic determination circuit.

17. The system of claim 13, wherein the resonance circuit has a capacitor and an inductor that combine to generate the resonance signals.

18. The system of claim 13, wherein the position indicator further includes a plurality of push buttons, and wherein the push-button circuit includes a set of resistors and capacitors for each push button, with each set of resistors and capacitors producing a different RC constant for each push button.

* * * * *